(12) United States Patent
Mosley

(10) Patent No.: US 7,080,268 B2
(45) Date of Patent: Jul. 18, 2006

(54) METHOD AND APPARATUS FOR REGULATING POWER TO ELECTRONIC CIRCUITS

(75) Inventor: Larry E. Mosley, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 402 days.

(21) Appl. No.: 10/308,487

(22) Filed: Dec. 3, 2002

(65) Prior Publication Data

US 2004/0107370 A1   Jun. 3, 2004

(51) Int. Cl.
G06F 1/26  (2006.01)

(52) U.S. Cl. .................. 713/320; 713/323
(58) Field of Classification Search .......... 713/300, 713/320, 322, 323
See application file for complete search history.

(56) References Cited

U.S. PATENT DOCUMENTS

| | | | |
|---|---|---|---|
| 5,745,375 A * | 4/1998 | Reinhardt et al. | 700/286 |
| 5,751,603 A | 5/1998 | Landolf | |
| 5,778,237 A * | 7/1998 | Yamamoto et al. | 713/322 |
| 5,812,860 A * | 9/1998 | Horden et al. | 713/322 |
| 5,822,596 A * | 10/1998 | Casal et al. | 713/322 |
| 5,852,737 A * | 12/1998 | Bikowsky | 713/323 |
| 6,118,306 A * | 9/2000 | Orton et al. | 327/44 |
| 6,212,641 B1 * | 4/2001 | Frank et al. | 713/323 |
| 6,304,823 B1 * | 10/2001 | Smit et al. | 702/60 |
| 6,457,135 B1 * | 9/2002 | Cooper | 713/323 |
| 6,459,175 B1 * | 10/2002 | Potega | 307/149 |
| 6,513,124 B1 * | 1/2003 | Furuichi et al. | 713/322 |
| 6,519,707 B1 * | 2/2003 | Clark et al. | 713/322 |
| 6,715,090 B1 * | 3/2004 | Totsuka et al. | 713/323 |
| 6,754,837 B1 * | 6/2004 | Helms | 713/322 |
| 6,763,478 B1 * | 7/2004 | Bui | 713/600 |
| 6,889,331 B1 * | 5/2005 | Soerensen et al. | 713/320 |

FOREIGN PATENT DOCUMENTS

JP   11-69622   * 3/1999

* cited by examiner

*Primary Examiner*—Chun Cao
(74) *Attorney, Agent, or Firm*—Schwegman, Lundberg, Woessner & Kluth, P.A.

(57) ABSTRACT

A method and apparatus for supplying power to a load. The apparatus comprising a voltage regulator circuit and a controller coupled to the voltage regulator circuit. The controller to cause the voltage regulator circuit to maintain a first voltage for the load operating in the first mode. The controller to detect a change in the operating mode of the load and to cause the voltage regulator circuit to output a second voltage. Prior to causing the voltage regulator circuit to output a second voltage the controller may allow voltage and current to stabilize at the load at a value between the first mode and a second mode.

41 Claims, 3 Drawing Sheets

METHOD AND APPARATUS FOR REGULATING POWER TO ELECTRONIC CIRCUITS

BACKGROUND

1. Field of the Invention

The present invention is related to the field of electronic devices. In particular, the present invention is related to a method and apparatus for supplying power to electronic circuits.

2. Description of the Related Art

Power supplies generate power and maintain a relatively constant voltage and current for circuits of an electronic system. Power supplies generally convert an alternating current (AC) input voltage into a regulated direct current (DC) output voltage. In instances where the power supply input voltage is a DC voltage, the power supply may be a DC-DC converter such as a linear or a switching voltage regulator. A load line of a power supply may be defined as a line that represents the load current for different values of load voltages.

FIG. 1 illustrates a conventional a power supply load line. As illustrated in FIG. 1, the conventional power supply load line 108 represents the voltage and current values of a load (i.e., an electronic circuit) between a no load condition (zero load current) and a full load condition (maximum load current). At 110, the no load condition, when the load current is zero the load voltage is maximum; and at 112, the full load condition, when the load current is maximum the load voltage is minimum. Between the no load condition and the full load condition the conventional load line is substantially linear, indicating that the voltage and currents output by a voltage regulator between these two points is linear. As illustrated in FIG. 1, the load line 108 is shifted by a certain margin below line 106. Line 106 is the rel-line (reliability-line), and the margin by which the load line is shifted is approximately equal to the voltage drops produced by the voltage regulator control tolerance, the DC drop (the voltage drop due to the DC components of the load), and the AC drop (the voltage drop due to AC components of the load). The rel-line 106 represents the maximum voltage a circuit may be exposed to for a given value of current. Operating a load at a margin below the rel-line prevents the load from being damaged in the event of a voltage overshoot.

Successive generations of microprocessors operate at increasing frequencies and consume increasing amounts of currents. These operating frequencies are much greater than the switching frequencies of the voltage regulators employed in the power supplies that supply power to the microprocessors. Therefore, the power supplies' decoupling capacitors supply charge to the microprocessors until the voltage regulator of the power supply can respond to the current demands of the microprocessor. This means that for successive generations of microprocessors to operate properly, the voltage regulator's decoupling capacitance may be increased, the voltage regulators may switch at higher frequencies, the interconnect resistance of the circuits may have to be reduced, etc. The net result of implementing these solutions is that system impedance (i.e., the impedance of the load) is reduced and the cost of supplying power increases. Therefore, these solutions for supplying power to a load are undesirable.

BRIEF SUMMARY OF THE DRAWINGS

Example embodiments of the present invention are illustrated in the accompanying drawings. The accompanying drawings, however, do not limit the scope of the present invention. Similar references in the drawings indicate similar elements.

DETAILED DESCRIPTION

Described is a method and apparatus for supplying power to electronic circuits. The apparatus comprises a voltage regulator circuit coupled to a controller to supply power to a load. The controller to cause the voltage regulator circuit to maintain a first voltage at the load for the load operating in a first mode. The controller to detect a change in the operating mode of the load. The controller to cause the voltage regulator circuit to output a second voltage when the change in the operating mode of the load is detected. In one embodiment of the invention, the controller allows voltage and current to stabilize at the load at values between the first mode and the second mode prior to the voltage regulator outputting the second voltage. The first voltage and the second voltage being below the maximum permissible voltages for the load and are therefore voltages below the corresponding rel-line voltages. The second voltage is higher than the stabilized load voltage when the load transitions from the first mode to the second mode, said first mode being a low power consumption mode and said second mode being a high power consumption mode. The second voltage is lower than the stabilized load voltage when the load transitions from the first mode to the second mode said first mode being a high power consumption mode and said second mode being a lower power consumption mode.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one of ordinary skill in the art to effect such feature, structure, or characteristic in connection with other embodiments whether or not explicitly described. Parts of the description are presented using terminology commonly employed by those of ordinary skill in the art to convey the substance of their work to others of ordinary skill in the art.

In the following description and claims, the terms "coupled" and "connected", along with derivatives such as "communicatively coupled" may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct physical contact with each other, but still co-operate or interact with each other.

Figure 2:
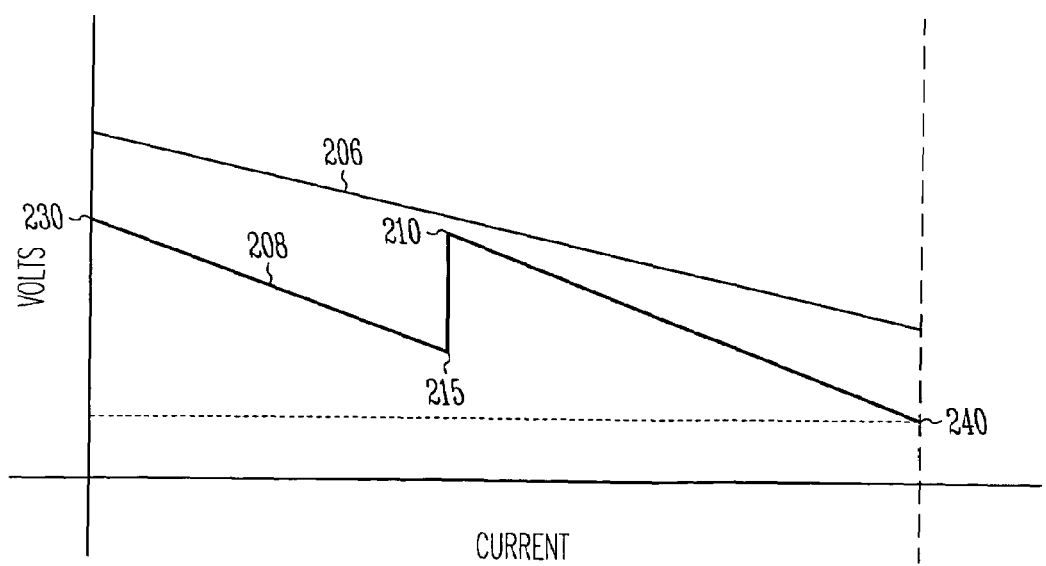
FIG. 2 illustrates a power supply load line according to one embodiment of the invention.
Figure 3:
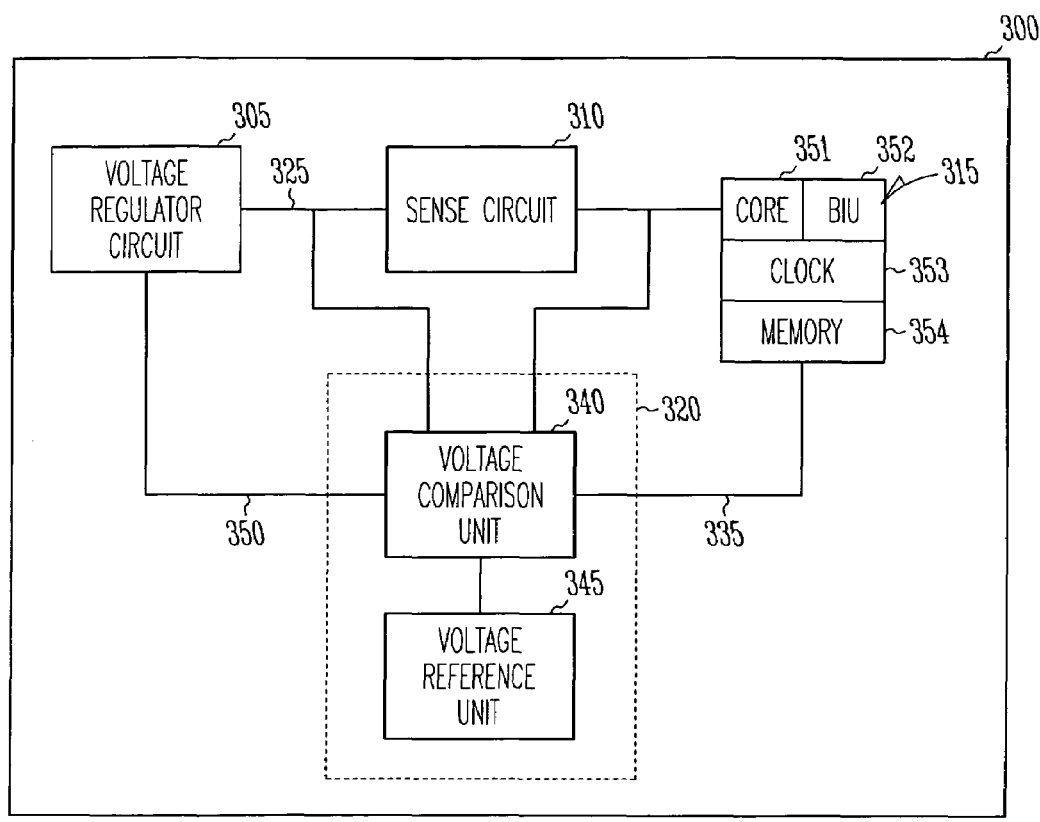
FIG. 3 illustrates a block diagram of a power supply according to one embodiment of the invention.

FIG. 2 illustrates a power supply load line according to one embodiment of the invention. FIG. 3 illustrates a block diagram of a power supply according to one embodiment of the invention. As illustrated in FIG. 3, the power supply 300 comprises a voltage regulator circuit 305 coupled to a load 315 via a sense circuit 310. The load 315 may be any electronic circuit that operates in any one of a plurality of modes (e.g., a low power mode and a high power mode). Load 315 may include a microprocessor e.g., a microprocessor of the Pentium family of microprocessors manufactured by Intel® Corporation of Santa Clara, Calif. The microprocessor may comprise a core 351 that executes program instructions, and may comprise a floating point unit, an integer unit etc. The microprocessor may further include a bus interface unit 352 coupled to core 351, a clock 353 coupled to the bus interface unit 352 and to the core 351, and memory 354. Memory 354 is coupled to the microprocessor and may be internally or externally disposed to the microprocessor.

Controller 320 is coupled to the sense circuit 310 and controls the power (i.e., voltage and/or current) output by voltage regulator circuit 305. Controller 320 uses one or more control lines 350 to control the voltage regulator circuit 305. The voltage regulator circuit 305 outputs a DC voltage at 325. Sense circuit 310 may be a resistor having a low resistance (e.g., a 5 mili-ohm resistance with a 1 percent tolerance), and the voltage across the sense circuit 310 is coupled to controller 320. The voltage across the sense circuit 310 is a measure of the load current. For example, if the load current increases the voltage across sense circuit 310 increases and vice versa. Controller 320 comprises a voltage comparison unit 340 and a voltage reference unit 345. The voltage comparison unit 340 compares the voltage across sense circuit 310 with one or more reference voltages stored in voltage reference unit 345. The reference voltages stored in voltage reference unit 345 may be programmed during manufacture of power supply 300 and represent the voltages corresponding to the different operating modes of the load 315. For example, if a reference voltage of 2V is stored in voltage reference unit 345, and 2V represents a low power mode for load 315, then if the voltage across sense circuit 310 is 2V, controller 320 is aware of the operating mode of the load 315. Controller 320 may thus monitor the voltage across sense circuit 310, determine the operating mode of load 315 and control voltage regulator circuit 305 as described below. In one embodiment of the invention, a line 335 from load 315 to controller 320 may signal the controller 320 the operating mode of the load.

As illustrated in FIG. 2, at 230, on load line 208 the load 315 operates in a first mode. In the first mode, the microprocessor may be in, e.g., a stop clock mode or any other low power mode. In the stop clock mode, the microprocessor's clock 353 is stopped and current that flows through the microprocessor is essentially a leakage current. Therefore, in one embodiment of the invention the current through load 315 in the first mode may be substantially zero. In one embodiment of the invention, the controller 320 senses the current flowing through the load, determines the operating mode of the microprocessor as described above and signals the voltage regulator circuit 305, via control line 350, to maintain a first voltage at the load. In one embodiment of the invention, controller 320 may receive a signal from the microprocessor via line 335 that informs the controller of the microprocessor's operating mode.

When the microprocessor exits the stop clock mode during a transition to a normal instruction execution mode, the current through load 315 increases and the load voltage decreases. Points 230 and 240 on the loadline indicate this transition from the first operating mode to a second operating mode (normal instruction execution mode). At point 215, on the load line 208 the load voltage and current are at some intermediate point between the first operating mode 230 and a second operating mode 240. When the microprocessor exits the first operating mode, controller 320 detects the increase in load current by sensing the increased voltage across the sense circuit 310, or by receiving a signal from the microprocessor via line 335 that informs the controller of the change in the microprocessor's operating mode. When controller 320 detects or is informed of the change in the microprocessor's operating mode, controller 320 may allow a certain configurable time interval to elapse for the voltage and current through load 315 to stabilize. In one embodiment of the invention, the controller 320 signals the voltage regulator circuit 305 to output a second voltage as soon as, or some configurable time thereafter, the controller detects a transition in the load without waiting for the load voltage and current to stabilize. In one embodiment of the invention, the controller 320 signals the voltage regulator circuit 305 to output a series of voltages, wherein each voltage is below the rel-line voltage, as soon as the controller 320 detects a transition in the load from the first mode to a second mode. In one embodiment of the invention, the voltage at load 315 stabilizes at a point on loadline 208 that is at a voltage of at least 3% of the voltage of the first operating mode. In one embodiment of the invention, the current at the load 315 stabilizes at a point on loadline 208 that is at a value of at least 20% of the value of the maximum current of the load or of the circuit comprising the load. During the time interval allowed by controller 320 for the load voltage and current to stabilize, one or more microprocessor circuits e.g., the clock 353 may operate, and other circuits such as the floating point unit of core 351, the bus interface unit 352, etc. may not. In one embodiment of the invention, the microprocessor may run one or more no-operation instructions (NOPs) during this time interval. At point 215, on the loadline the voltage and current of the load 315 stabilizes. The controller 320 detects the stabilized voltage and signals the voltage regulator circuit 305, via control line 350, to output the second voltage. This is indicated by point 210 on the loadline. When the load 315 transitions from a low power consumption mode (e.g., the stop clock mode) to a high power consumption mode (e.g., the normal instruction execution mode), the second voltage that the voltage regulator circuit 305 outputs at 210 is higher than the stabilized voltage at point 215. In one embodiment of the invention, the second voltage output by the voltage regulator circuit 305 is below the voltage on rel-line 206 for a corresponding current value. After, the voltage regulator circuit 305 outputs the second voltage, the microprocessor powers up other circuitry e.g., the floating point unit in core 351, the bus interface unit 352, etc., and resumes normal execution of instructions. In one embodiment of the invention, when the controller 320 signals the voltage regulator circuit 305 to output a series of voltages, each voltage in the series of voltages corresponds with the power up of the one or more microprocessor circuits stated above. The resumption of normal execution of instructions may cause a further increase in load current and a decrease in load voltage as indicated by the loadline between points 210 and 240. By causing the voltage regulator circuit 305 to increase load voltage between points 215 and 210 on loadline 208, higher system impedance is achieved as compared with the conventional loadline 108 illustrated in FIG. 1.

Figure 1:
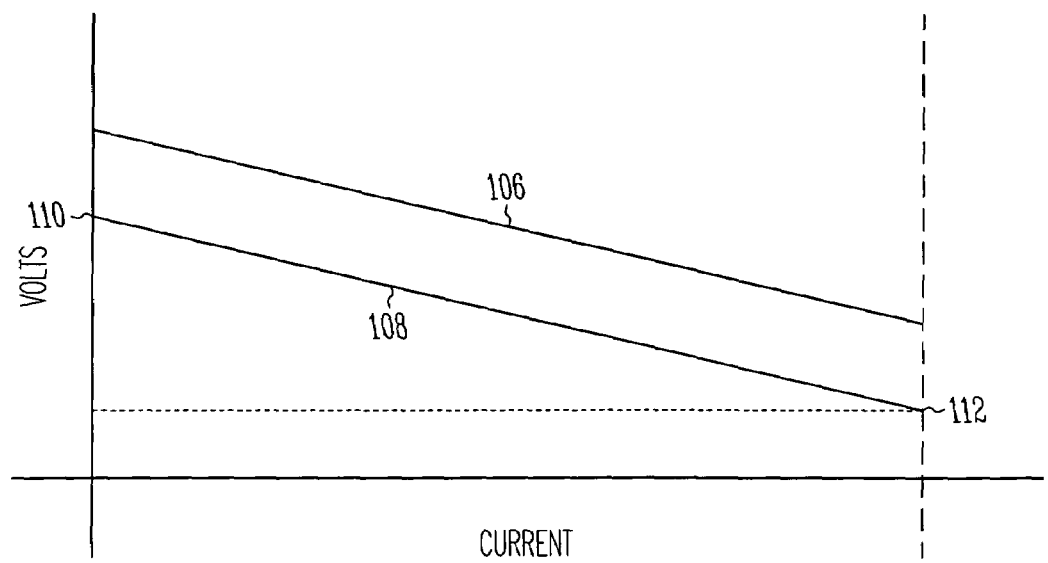
FIG. 1 illustrates a conventional power supply load line.

For example, consider the conventional loadline of FIG. 1. If the voltage at point 110 is 1V with a load current of 0 A, and the voltage at point 112 is 0.9 V with a load current of 100 A, the impedance of system, calculated as the change in voltage divided the change in current, is 1 mili ohm. Now consider the loadline of FIG. 2. If the voltage at point 210 is 1V for a load current of 50 A and the voltage at point 240 is 0.9V with a load current of 100 A, the impedance of the system is now 2 mili ohm. Thus, by increasing the load voltage at point 215, higher system impedance is achieved. Having higher system impedance enables the voltage regulator to use smaller decoupling capacitors, and to switch at slower speeds. Also, higher system impedance enables a system to have a higher interconnect resistance, etc. This reduces the cost for supplying power to a load.

When the microprocessor transitions from the high power consumption mode to the low power consumption mode, the following process are followed. At point 240 on the loadline of FIG. 2, the microprocessor is in the normal instruction execution mode (i.e., the high power consumption mode) and the controller 320 causes the voltage regulator circuit to maintain the load voltage at a first voltage value. When the microprocessor exits the normal instruction execution mode, the load voltage increases and the load current decreases. The controller 320 senses the change in load current, or is informed of the change by the microprocessor via line 335. In one embodiment of the invention the controller 320 signals the voltage regulator circuit 305 to output the second voltage as soon as the change in the operating mode of the load is detected, or some configurable time thereafter. In one embodiment of the invention, the second voltage may be a series of voltage decrements as the load transitions from the high power consumption mode to the low power consumption mode. In one embodiment of the invention, the controller 320 allows some configurable time to elapse for the load voltage and current to stabilize at point 210 on the loadline 208. In one embodiment of the invention, the point at which the current stabilizes is the same point at which the current stabilized in going from a low power consumption mode to a high power consumption mode. During this time, the microprocessor may execute one or more no-operation instructions and one or more circuits e.g., the floating point unit in core 351, the bus interface unit 352 etc. may shut down, and other circuits e.g., the clock 353 may continue to operate. When the microprocessor's voltage and current have stabilized, the controller 320 signals the voltage regulator circuit 305 to output a second voltage. The second voltage output by the voltage regulator circuit 305, at point 215 on the loadline 208, is lower than the stabilized voltage of point 210 on the loadline. Therefore, the second voltage output by the voltage regulator circuit 305 is below the corresponding voltage on rel-line 206. Once the voltage regulator circuit outputs the second voltage, the microprocessor enters the stop clock mode at point 230 on the loadline.

Figure 4:
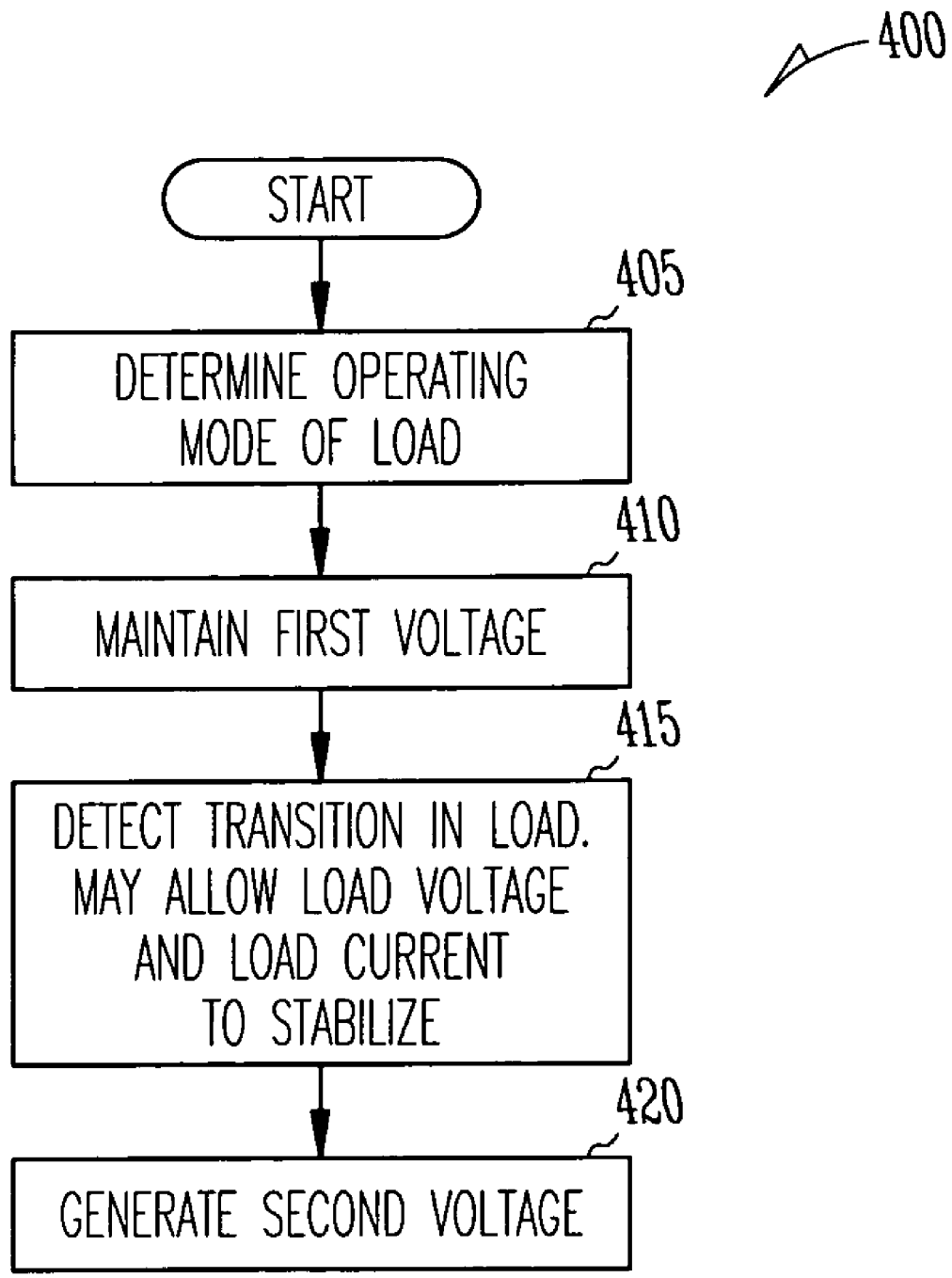
FIG. 4 is a flow diagram illustrating the operations performed by a power supply according to one embodiment of the invention.

FIG. 4 is a flow diagram illustrating the operations performed by a power supply according to one embodiment of the invention. As illustrated in FIG. 4, at 405 controller 320 determines the operating mode of the load 315. At 410, the controller 320 signals the voltage regulator circuit 305 to maintain a first voltage at the load 315 for the load operating in the first operating mode. At 415, the controller 320 detects a change or transition in the operating mode of the load and may allow the load voltage and current to stabilize at a value in between the first operating mode and a second operating mode. In one embodiment of the invention, the controller does not allow the voltage and the current to stabilize, but outputs a second voltage after the change in the operating mode of the load is detected. The second voltage may be generated as soon as the controller detects the change in the operating mode of the load or some configurable time thereafter. For a load comprising a microprocessor, in the first operating mode some circuits e.g., the clock 353 may operate whereas other circuits, e.g., the floating point unit in core 351, the bus interface unit 353 etc. may not operate. At 420, the controller 320 signals the voltage regulator circuit 305 to output a second voltage at the stabilized load current. Thereafter, the operating mode of the load is changed to the second mode. The first voltage, the second voltage, and the stabilized voltage are below the maximum permissible voltages for the load and are therefore voltages below the corresponding rel-line voltages. The second voltage is higher than the stabilized load voltage when the load transitions from the first mode (a low power consumption mode) to the second mode (a high power consumption mode). The second voltage is lower than the stabilized load voltage when the load transitions from the first mode (a high power consumption mode) to the second mode (a low power consumption mode).

Thus, a method and apparatus have been disclosed supplying power to electronic circuits. While there has been illustrated and described what are presently considered to be example embodiments of the present invention, it will be understood by those skilled in the art that various other modifications may be made, and equivalents may be substituted, without departing from the true scope of the invention. Additionally, many modifications may be made to adapt a particular situation to the teachings of the present invention without departing from the central inventive concept described herein. Therefore, it is intended that the present invention not be limited to the particular embodiments disclosed, but that the invention include all embodiments falling within the scope of the appended claims.

What is claimed is:

1. An apparatus comprising:
a voltage regulator circuit to regulate power at a load; and
a controller coupled to the voltage regulator circuit, said controller to cause the voltage regulator circuit to maintain a first voltage at the load when the load operates in a first mode, the controller to detect a transition in the load from the first mode to a second mode, the controller to cause the voltage regulator circuit to output a second voltage that is higher than a stabilized voltage, after the controller detects the transition in the load from the first mode to the second mode.

2. The apparatus of claim 1, wherein the controller is to allow voltage and current to stabilize at the load at voltage and current values between the first mode and the second mode prior to the controller causing the voltage regulator circuit to output the second voltage.

3. The apparatus of claim 1, wherein the controller is to allow the load to transition to the second mode after the voltage regulator circuit outputs the second voltage.

4. The apparatus of claim 1 further comprising a current sense circuit to couple the load to the voltage regulator circuit.

5. The apparatus of claim 2 wherein the first voltage, the stabilized voltage, and the second voltage are below a maximum permissible voltage for the load.

6. The apparatus of claim 2 wherein the second voltage is higher than the stabilized load voltage when the load transitions from the first mode to the second mode, said first mode being a low power consumption mode and said second mode being a high power consumption mode.

7. The apparatus of claim 2 wherein the second voltage is lower than the stabilized bad voltage when the load transitions from the first mode to the second mode said first mode being a high power-consumption mode and said second mode being a lower power consumption mode.

8. The apparatus of claim 1 wherein the load comprises a microprocessor.

9. The apparatus of claim 8 wherein the controller to cause the voltage regulator circuit to output a second voltage comprises the voltage regulator circuit to output a higher voltage than the stabilized load voltage when the microprocessor transitions from a low power consumption mode to a high power consumption mode.

10. The apparatus of claim 8 wherein the controller to cause the voltage regulator circuit to output a second voltage comprises the voltage regulator circuit to output a lower voltage than the stabilized load voltage when the microprocessor transitions from a high power consumption mode to a low power consumption mode.

11. A method for regulating power in a circuit comprising:
maintaining a first voltage at a load for the load operating in a first mode;
detecting a change in a first operating mode of the load when the load transitions from the first mode to a second mode; and
generating a second voltage that is higher than a stabilized voltage but lower than a maximum voltage for the load, after the change in the first operating mode of the load is detected.

12. The method of claim 11 wherein generating a second voltage when the change in the first operating mode of the load is detected comprises allowing voltage and current to stabilize at the load prior to generating the second voltage.

13. The method of claim 12 wherein generating a second voltage at the stabilized value of load current comprises generating a higher voltage than the stabilized voltage when the load transitions from a low power consumption mode to a high power consumption mode.

14. The method of claim 11 wherein generating a second voltage at the stabilized value of load current comprises generating a lower voltage than the stabilized voltage when the load transitions from a high power consumption mode to a low power consumption mode.

15. The method of claim 12 wherein the first voltage, the stabilized voltage, and the second voltage are less than a maximum permissible voltage for the circuit.

16. The method of claim 11 wherein detecting a change in the first operating mode of the load comprises any one of a controller detecting the change in the first operating mode of the load, and the load signaling the controller of the change in the first operating mode of the load.

17. The method of claim 12 wherein allowing voltage and current to stabilize at the load comprises at least one of allowing the voltage to stabilize at a value that is at least 3% of the voltage of the first mode, and allowing the current to stabilize at a value of at least 20% of a value of a maximum current of the load.

18. The method of claim 11 further comprising allowing the load to operate in a second mode after generating the second voltage.

19. An apparatus comprising:
a microprocessor, said microprocessor comprising a bus interface unit, a core coupled to the bus interface unit, and a clock coupled to the bus interface unit and the core; and
a voltage regulator circuit to regulate power to the microprocessor, a controller coupled to the voltage regulator circuit, said controller to cause the voltage regulator circuit to maintain a first voltage at the microprocessor, when the microprocessor operates in a first mode, and the controller to cause the voltage regulator circuit to output a second voltage that is higher than a stabilized voltage during a transition of the microprocessor between the first mode and a second mode.

20. The apparatus of claim 19 further comprising, the microprocessor to operate in the second mode after the voltage regulator circuit outputs the second voltage.

21. The apparatus of claim 19 wherein the controller to allow voltage and current to stabilize between the first mode and the second mode prior to the voltage regulator outputting the second voltage.

22. The apparatus of claim 21 wherein second voltage is higher than the stabilized voltage when the microprocessor transitions from a low power consumption mode to a high power consumption mode.

23. The apparatus of claim 21 wherein the second voltage is lower than the stabilized voltage when the microprocessor transitions from a high power consumption mode to a low power consumption mode.

24. The apparatus of claim 19 wherein the first voltage and the second voltage are below a maximum permissible voltage for the microprocessor.

25. The apparatus of claim 19 further comprising a current sense circuit to couple the microprocessor to the voltage regulator circuit.

26. The apparatus of claim 19 wherein the first voltage and the second voltage are output by the voltage regulator circuit when the microprocessor transitions between a stop clock mode and an instruction execution mode and vice versa.

27. The apparatus of claim 19 wherein the first mode comprises the voltage regulator supplying power to the clock.

28. A computer system comprising:
a load comprising a microprocessor and a memory coupled to the microprocessor;
a power supply to supply power to the load said power supply comprising a voltage regulator circuit to regulate power at the load; and
a controller coupled to the voltage regulator circuit, said controller to cause the voltage regulator circuit to maintain a first voltage for the microprocessor operating in a first mode, and the controller to cause the voltage regulator circuit to output a second voltage that is higher than a stabilized voltage but lower than a maximum voltage for the load during a transition of the microprocessor between the first mode and a second mode.

29. The computer system of claim 28 wherein the controller to cause the voltage regulator circuit to output a second voltage during the transition of the microprocessor between the first mode and a second mode comprises the controller to allow voltage and current to stabilize at the load prior to the controller causing the voltage regulator circuit to output the second voltage.

30. The computer system of claim 28 further comprising, the microprocessor to operate in the second mode after the voltage regulator circuit outputs the second voltage.

31. The computer system of claim 28 further comprising a current sense circuit to couple the load to the voltage regulator circuit.

32. The computer system of claim 29 wherein the first voltage, the stabilized voltage, and the second voltage are below a maximum permissible voltage for the load.

33. The computer system of claim 29 wherein the second voltage is higher than the stabilized load voltage when the load transitions from the first mode to the second mode, said first mode being a low power consumption mode of the microprocessor and said second mode being a high power consumption mode of the microprocessor.

34. The computer system of claim 29 wherein the second voltage is lower than the stabilized load voltage when the load transitions from the first mode to the second mode said first mode being the microprocessor's high power consumption mode and said second mode being the microprocessor's low power consumption mode.

35. The computer system of claim 29 wherein the controller to allow voltage and current to stabilize at the load comprises the controller to allow the microprocessor to execute one or more no-operation instructions.

36. An apparatus comprising:
a sense circuit coupled to a voltage regulator circuit and a load;
a controller coupled to the sense circuit and the voltage regulator circuit, said controller comprising a voltage comparison unit and a voltage reference unit, the voltage comparison unit to compare the voltage across the sense circuit with a reference voltage in the voltage reference unit to determine an operating mode of the load, the voltage comparison unit to cause the voltage regulator circuit to maintain a first voltage when the load operates in a first mode, the voltage comparison unit to detect a transition in the load from the first mode to a second mode, and to cause the voltage regulator circuit to output a second voltage that is higher than a stabilized voltage, after the controller detects the transition in the load from the first mode to the second mode.

37. The apparatus of claim 36 further comprising the controller to allow voltage and current to stabilize at the load at voltage and current values between the first mode and the second mode prior to the controller causing the voltage regulator circuit to output the second voltage.

38. The apparatus of claim 36 further comprising, allowing the load to transition to the second mode after the voltage regulator circuit outputs the second voltage.

39. The apparatus of claim 36 wherein the first voltage and the second voltage are below a maximum permissible voltage for the load.

40. The apparatus of claim 36 wherein the second voltage comprises one or more increasing voltages when the load transitions from the first mode to the second mode, said first mode being a low power consumption mode and said second mode being a high power consumption mode.

41. The apparatus of claim 36 wherein the second voltage comprises one or more decreasing voltages when the load transitions from the first mode to the second mode, said first mode being a high power consumption mode and said second mode being a low power consumption mode.

* * * * *

UNITED STATES PATENT AND TRADEMARK OFFICE
CERTIFICATE OF CORRECTION

| | | |
|---|---|---|
| PATENT NO. | : 7,080,268 B2 | Page 1 of 1 |
| APPLICATION NO. | : 10/308487 | |
| DATED | : July 18, 2006 | |
| INVENTOR(S) | : Mosley | |

It is certified that error appears in the above-identified patent and that said Letters Patent is hereby corrected as shown below:

On the Title page, in field (56), under "U.S. Patent Documents", in column 2, line 8, after "6,519,707" delete "B1" and insert -- B2 --, therefor.

On the Title page, in field (56), under "U.S. Patent Documents", in column 2, line 12, after "6,889,331" delete "B1" and insert -- B2 --, therefor.

In column 7, line 5, in Claim 7, delete "bad" and insert -- load --, therefor.

In column 7, line 7, in Claim 7, delete "power-consumption" and insert -- power consumption --, therefor.

Signed and Sealed this

Sixth Day of January, 2009

JON W. DUDAS
*Director of the United States Patent and Trademark Office*